(12) United States Patent
Hama et al.

(10) Patent No.: US 8,461,279 B2
(45) Date of Patent: Jun. 11, 2013

(54) METHOD FOR PRODUCING DEVOLATILIZED POLYOLEFIN AND MOLDED ARTICLE OF POLYOLEFIN

(75) Inventors: Hisakatsu Hama, Ichihara (JP); Tetsuro Dobashi, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/540,010

(22) Filed: Jul. 2, 2012

(65) Prior Publication Data

US 2013/0012676 A1 Jan. 10, 2013

(30) Foreign Application Priority Data

Jul. 5, 2011 (JP) ................. 2011-148866

(51) Int. Cl.
*C08F 110/06* (2006.01)
*C08F 110/02* (2006.01)

(52) U.S. Cl.
USPC ........... 526/351; 526/170; 526/172; 526/348; 528/193; 528/194; 528/196

(58) Field of Classification Search
USPC ................. 526/170, 172, 351, 348; 528/193, 528/194, 196, 198
See application file for complete search history.

(56) References Cited

FOREIGN PATENT DOCUMENTS

| | | | |
|---|---|---|---|
| JP | 05-116205 A | 5/1993 | |
| JP | 07-088927 A | 4/1995 | |
| JP | 10-036578 A | 2/1998 | |
| JP | 10-249913 A | 9/1998 | |

*Primary Examiner* — Terressa Boykin
(74) *Attorney, Agent, or Firm* — Panitch Schwarze Belisario & Nadel LLP

(57) ABSTRACT

Disclosed is a method for producing a devolatilized polyolefin, wherein the method comprises a step that involves providing a twin screw extruder comprising a resin feeding port, a first molten resin kneading zone, a molten resin partially filled zone which is prevented from being fully filled with molten resin, a second molten resin kneading zone, and a devolatilization zone that are disposed in order from the upstream of a cylinder of the extruder, feeding a polyolefin through the resin feeding port, and feeding water to the molten resin partially filled zone in an amount of 0.01 to 50 parts by weight relative to 100 parts by weight of the polyolefin.

6 Claims, 2 Drawing Sheets

METHOD FOR PRODUCING DEVOLATILIZED POLYOLEFIN AND MOLDED ARTICLE OF POLYOLEFIN

BACKGROUND OF THE INVENTION

1. Field of the Invention

The present invention relates to a method for producing a devolatilized polyolefin, the method being capable of preventing water fed into a twin screw extruder from flowing backwards during water injection foaming devolatilizatin of a polyolefin and hardly allowing cavitation to occur in a water injection pipe, and to a molded polyolefin article superior in low fogging property.

2. Related Art

Heretofore, plastics have been used for automotive interior materials because weight reduction or diversified design can be achieved thereby. Especially, polyolefin-based resin compositions have been used because of their less inclusion of plasticizers, which will cause fogging, and in view of their influence to the environment caused after their disposal.

JP 10-36578 A, has disclosed a resin composition for an automotive interior material, the composition comprising an olefin-based resin, a thermoplastic elastomer, and an additive and having been prepared by kneading these materials for 30 seconds by using a twin screw extruder under heating at 240 to 250° C.; JP 5-116205 A has disclosed a method for producing a polyolefin with low odor by adding water to a polymer at a hopper, and performing devolatilization by using an extruder with a vent; and JP 7-88927 A and JP 10-249913 A each have disclosed a method for removing volatile components by water injection foaming devolatilization performed within a twin screw extruder with a vent. It has been disclosed that thanks to the provision of a ring in a dispersion zone, water is successfully distributed uniformly into resin by filling molten resin into that zone and injecting water thereinto with pressure, and then volatile components contained in the resin are removed by performing foaming devolatilization at a devolatilization zone provided downstream from that zone.

However, the resin composition disclosed in JP 10-36578 A may suffer from degradation of resin and deterioration in low fogging property due to the presence of the degraded resin because the resin composition is kneaded at high temperature; the method disclosed in JP 5-116205 A may result in the occurrence of feeding failure because when water is injected through a hopper together with resin in a powdery or pelletized form, the resin and the water may not be mixed successfully in a kneading zone, causing backflow of the water; and in the method disclosed in JP 7-88927 A and JP 10-249913 A, in the case that the cylinder of the extruder is provided with a water injection port within a kneading zone to be filled up with resin and equipped with a water injection pump via a water injection pipe, when water is pumped into the cylinder through the water injection port via the water injection pipe, the water may boil in the water injection pipe to cause cavitation in the pipe, so that it may become difficult to inject water.

Under such situations, the problem to be solved by the present invention is to provide a method for producing a devolatilized polyolefin, the method being capable of preventing water fed into a twin screw extruder from flowing backwards within the extruder during water injection foaming devolatilizatin of a polyolefin and hardly allowing cavitation to occur in a water injection pipe, and provide a molded polyolefin article superior in low fogging property.

SUMMARY OF THE INVENTION

The present invention relates to a method for producing a devolatilized polyolefin, wherein the method comprises a step that involves:

providing a twin screw extruder comprising a resin feeding port, a first molten resin kneading zone, a molten resin partially filled zone which is prevented from being fully filled with molten resin, a second molten resin kneading zone, and a devolatilization zone that are disposed in order from the upstream of a cylinder of the extruder, feeding a polyolefin through the resin feeding port, and feeding water to the molten resin partially filled zone in an amount of 0.01 to 50 parts by weight relative to 100 parts by weight of the polyolefin, thereby performing foaming devolatilization of the polyolefin.

According to the present invention, it is possible to prevent water fed into a twin screw extruder from flowing backwards during water injection foaming volatilization of a polyolefin and cavitation is hardly generated in a water injection pipe, so that a polyolefin superior in low fogging property can be produced.

Figure 1:
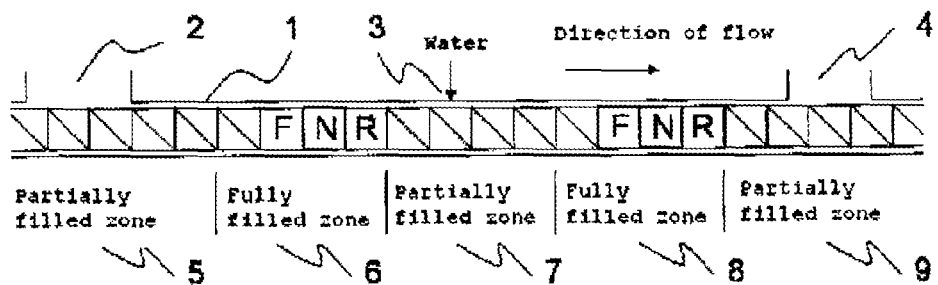
FIG. 1 includes a diagram that shows a cross-sectional view taken along the axial direction of the twin screw extruder to be used for the method for producing a devolatilized polyolefin according to the present invention and a diagram showing the characteristic of filling a resin in the axial direction.

In the drawings, the respective codes have the following meanings:

1: cylinder, 2: polyolefin feeding port, 3: water injection port, 4: vent port, 5, 7, 10, 12: full flight screw (partially filled zone), 6, 11: first molten resin kneading zone (fully filled zone), 8, 13, 14: second molten resin kneading zone (fully filled zone), 9: full flight screw (devolatilization zone), F: forward kneading disc, N: orthogonal kneading disc, R: reverse kneading disc.

DESCRIPTION OF THE PREFERRED EMBODIMENTS

The method for producing a devolatilized polyolefin of the present invention includes a step that involves:

providing a twin screw extruder comprising a resin feeding port, a first molten resin kneading zone, a molten resin partially filled zone which is prevented from being fully filled with molten resin, a second molten resin kneading zone, and a devolatilization zone that are disposed in order from the upstream of the cylinder of the extruder, feeding a polyolefin through the resin feeding port, and feeding water to the molten resin partially filled zone in an amount of 0.01 to 50 parts by weight relative to 100 parts by weight of the polyolefin, thereby performing foaming devolatilization of the polyolefin.

As used herein, the term "partially filled zone" refers to a zone which is prevented from being fully filled with molten resin. This is typically achieved by reducing the inner volume of the concerned section of the extruder which is available for being filled with the resin, such that only a part of the theoretically available inner diameter of the extruder is filled. Preferably, this reduction of the volume is achieved by providing a full flight screw in the inner volume of the extruder, which leaves only a reduced volume to be filled with molten resin.

In one preferred embodiment, the twin screw extruder to be used for the invented method for producing a devolatilized polyolefin has a resin feeding port, a first molten resin kneading zone, a molten resin partially filled zone which is prevented from being fully filled with molten resin by the provision of a flight section, a second molten resin kneading zone, and a devolatilization zone that are disposed in order from the upstream of the cylinder of the extruder. The cylinder of the devolatilization zone has a vent port and the vent port is usually connected to a vacuum pump via a vacuum line. In one embodiment of the present invention, a pair of co-rotatable screws is provided freely rotatably within the cylinder with the screws being mated with each other, and appropriate modification of the pattern of the screws results in the formation of a molten resin kneading zone or a molten resin partially filled zone that is prevented from being fully filled with molten resin. The provision of the flight section within the cylinder affords a screw configuration including a first molten resin kneading zone, a molten resin partially filled zone that is prevented from being fully filled with molten resin, and a second molten resin kneading zone arranged in order from the upstream of the cylinder Examples of the screw to be used for the flight section include a full flight screw.

Through the above-mentioned resin feeding port is fed a polyolefin. Examples of the polyolefin include ethylene homopolymers, such as high density polyethylene (HDPE) and low density polyethylene (LDPE), ethylene-1-butene copolymers, ethylene-1-hexene copolymers, ethylene-1-octene copolymers, ethylene-propylene-1-butene copolymers, ethylene-1-butene-1-hexene copolymers, propylene homopolymers, propylene-ethylene copolymers, propylene-1-butene copolymers, propylene-1-hexene copolymers, propylene-1-octene copolymers, propylene-ethylene-1-butene copolymers, propylene-ethylene-1-hexene copolymers, propylene-ethylene-1-octene copolymers, propylene-1-butene-1-hexene copolymers, 1,2-butadiene homopolymers, 1,4-butadiene homopolymers, isoprene homopolymers, ethylene-propylene-5-ethylidene-2-norbornene copolymers, ethylene-propylene-dicyclopentadiene copolymers, and ethylene-propylene-5-vinyl-2-norbornene copolymers; polypropylene is preferred.

The form of the polyolefin to be fed through the resin feeding port may be, for example, a block form, a pellet form, or a powdery form; it is preferably a form with a size smaller than the diameter of the feeding port.

The polyolefin to be used for the present invention may have formed a resin composition in which a resin other than the polyolefin or an additive has been blended.

Examples of the resin other than the polyolefin include butadiene-styrene copolymers, butadiene-acrylonitrile copolymers, styrene homopolymers, p-methylstyrene homopolymers, α-methylstyrene homopolymers, styrene-acrylonitrile copolymers, styrene-acrylonitrile-butadiene copolymers, acrylic rubber-acrylonitrile-styrene copolymers, and acrylonitrile-chlorinated polyethylene-styrene copolymers.

Examples of the additive include antioxidants, UV absorbers, light stabilizers, metal deactivators, nucleating agents, lubricants, antistatic agents, flame retardants, and pigments.

Examples of the antioxidants include phenol-based antioxidants, hydroquinone-based antioxidants, sulfur-containing antioxidants and phosphorus-containing antioxidants.

Examples of the phenol-based antioxidant include alkylated monophenols, such as pentaerythritol tetrakis[3-(3,5-di-tert-butyl-4-hydroxyphenyl) propionate], n-octadecyl-β-(4'-hydroxy-3',5'-di-tert-butylphenyl) propionate, 3,9-bis[1,1-dimethyl-2-[β-(3-tert-butyl-4-hydroxy-5-methylphenyl) propionyloxy]ethyl]2,4,8,10-tetraoxaspiro[5.5]-undecane, 2-[1-(2-hydroxy-3,5-di-tert-pentylphenyl)ethyl]-4,6-di-tert-pentylphenyl acrylate, 2-tert-butyl-6-(3-tert-butyl-2-hydroxy-5-methylbenzyl)-4-methylphenyl acrylate, 2,6-di-tert-butyl-4-methylphenol, 2,4,6-tri-tert-butylphenol, 2,6-di-tert-butylpheno, 2-tert-butyl-4,6-dimethylphenol, 2,6-di-tert-butyl-4-ethylphenol, 2,6-di-tert-butyl-4-n-butylphenol, 2,6-di-tert-butyl 4-iscbutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-di-nonyl-4-methylphenol, 2,4-dimethyl-6-(1'-methylundecyl-1'-yl)phenol, 2,4-dimethyl-6-(1'''-methylheptadecyl-1'-yl)phenol, 2,4-dimethyl-6-(1'-methyltridecyl-1'-yl)phenol, and mixtures thereof;

alkylthiomethylphenols, such as 2,4-dioctylthiomethyl-6-tert-butylphenol, 2,4-dioctyl thiomethyl-6-methylphenol, 2,4-dioctylthiomethyl-6-ethylphenol, 2,6-didodecylthiomethyl-4-nonylphenol, and mixtures thereof;

alkylidene bisphenols and derivatives thereof, such as 2,2'-methylenebis(4-methyl-6-tert-butylphenol), 2,2'-methylenebis(4-ethyl-6-tert-butylphenol), 2,2'-methylenebis[(4-methyl-6-(α-methylcyclohexyl)phenol]], 2,2'-methylenebis(4-methyl-6-cyclohexylphenol), 2,2'-methylenebis(4-methyl-6-nonyl phenol), 2,2'-methylenebis(4,6-di-tert-butylphenol), 2,2'-ethylidenebis(4,6-di-tert-butylphenol), 2,2'-ethylidenebis(4-isobutyl-6-tert-butylphenol), 2,2'-methylenebis[(6-(α-methylbenzyl)-4-nonylphenol], 2,2'-methylenebis[6-(α,α-dimethylbenzyl)-4-nonylphenol], 4,4'-methylenebis(6-tert-butyl-2-methylphenol), 4,4'-methylenebis(2,6-di-tert-butylphenol), 4,4'-butylidenebis(3-methyl-6-tert-butylphenol), 1,1-bis(4-hydroxyphenyl)cyclohexane, 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis-3'-tert-butyl-4'-hydxoxyphenyl]butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylm ercaptobutane, 1,1,5,5-tetra(5-tert-butyl-4-hydroxy-2-methylphenyl)pentane, and mixtures thereof;

acylaminophenol derivatives, such as 4-hydroxylauric anilide, 4-hydroxystearic anilide, octyl-N-(3,5-di-tert-butyl-4-hydroxyphenyl) carbamate, and mixtures thereof;

esters made up from β-(3,5-di-tert-butyl-4-hydroxyphenyl) propionate and at least one alcohol selected from the group consisting of methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiroglycol, triethylene glycol, pentaerythritol, tris(hydroxyethyl)isocyanurate, N,N'-bis(hydroxyethyl)oxamide, 3-thiaundecanol, 3-thiapentadecanol, trimethylhexandiol, trimethylolpropane, and 4-hydroxymethyl-1-phospha-2,6,7-trioxabicyclo[2,2,2]octane;

hydroxylated thiodiphenyl ethers, such as 2,2'-thiobis(6-tert-butylphenol), 2,2'-thiobis(4-methyl-6-tert-butylphenol), 2,2'-thiobis(4-octylphenol), 4,4'-thiobis(2-methyl-6-tert-butylphenol), and 4,4'-(2,6-dimethyl-4-hydroxyphehyl) disulfide;

benzyl derivatives (β-benzyl derivatives, N-benzyl derivatives, S-benzyl derivatives), such as 3,5,3',5'-tetra-tert-butyl-4,4'-dihydroxydibenzyl ether, octadecyl-4-hydroxy-3,5-dimethylbenzyl mercaptoacetate, tris(3,5-di-tert-butyl-4-hydroxybenzyl)amine, bis(4-tert-butyl-2-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzyl mercaptoacetate, and mixtures thereof;

triazine derivatives, such as 2,4-bis(n-octylthio)-6-(4-hydroxy-3,5-di-tert-butylanilino)-1,3,5-triazine, 2-n-octylthio-4,6-bis(4-hydroxy-3,5-di-tert-butylanilino)-1,3,5-triazine, 2-n-octylthio-4,6-bis(4-hydroxy-3,5-di-tert-butylphenoxy)-1,3,5-triazine, 2,4,6-tris(3,5-di-tert-butyl-4-phenoxy)-1,3,5-triazine, tris(4-tert-butyl-3-hydroxy-2,6-dimethylbenzyl)isocyanurate, tris(3,5-di-tert-butyl-4-hydroxybenzyl)isocyanurate, 2,4,6-tris(3,5-di-tert-butyl-4-hydroxyphenylethyl)-1,3,5-triazine, 2,4,6-tris(3,5-di-tert-butyl-4-hydroxyphenylpropyl)-1,3,5-triazine, tris(3,5-dicyclohexyl-4-hydroxybenzyl)isocyanurate, tris[2-(3',5'-di-tert-butyl-4'-hydroxycinnamoyloxy)ethyl]isocyanurate, and mixtures thereof;

hydroxybenzyl malonate derivatives, such as dioctadecyl-2,2-bis(3,5-di-tert-butyl-2-hydroxybenzyl)malonate, dioctadecyl-2-(3-tert-butyl-4-hydroxy-5-methylbenzyl)malonate, di-dodecylmercaptoethyl-2,2-bis(3,5-di-tert-butyl-4-hydroxy benzyl)malonate, bis[4-(1,1,3,3-tetrametylbutyl)phenyl]-2,2-bis(3,5-di-tert-butyl-4-hydroxybenzyl)malonate, and mixtures thereof;

aromatic hydroxybenzyl derivatives, such as 1,3,5-trimethyl-2,4,6-tris(3,5-di-tert-butyl-4-hydroxybenzyl)benzene, 1,4-bis(3,5-di-tert-butyl-4-hydroxybenzyl)-2,3,5,6-tetramethyl benzene, and 2,4,6-tris(3,5-tert-butyl-4-hydroxybenzyl)phenol, and mixtures thereof;

benzyl phosphonate derivatives, such as dimethyl-3,5-di-tert-butyl-4-hydroxybenzyl phosphonate, diethyl-3,5-di-tert-butyl-4-hydroxybenzyl phosphonate, dioctadecyl-3,5-di-tert-butyl-4-hydroxybenzyl phosphonate, dioctadecyl-5-tert-butyl-4-hydroxy-3-methylbenzyl phosphonate, calcium salt of 3,5-di-tert-butyl-4-hydroxybenzylphosphonic acid monoester, and mixtures thereof;

ester made up from β-(5-tert-butyl-4-hydroxy-3-methylphenyl)propionic acid and at least one alcohol selected from the group consisting of methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiroglycol, triethylene glycol, pentaerythritol, tris(hydroxyethyl) isocyanurate, N,N'-bis(hydroxyethyl)oxamide, 3-thiaundecanol, 3-thiapentadecanol, trimethylhexandiol, trimethylolpropane, and 4-hydroxymethyl-1-phospha-2,6,7-trioxabicyclo[2,2,2]octane;

esters made up from β-(3,5-dicyclohexyl-4-hydroxyphenyl) propionic acid and at least one alcohol selected from the group consisting of methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiroglycol, triethylene glycol, pentaerythritol, tris(hydroxyethyl) isocyanurate, N,N'-bis(hydroxyethyl)oxamide, 3-thiaundecanol, 3-thiapentadecanol, trimethylhexandiol, trimethylolpropane, and 4-hydroxymethyl-1-phospha-2,6,7-trioxabicyclo[2,2,2]octane;

esters made up from 3,5-di-tert-butyl-4-hydroxyphenylacetic acid and at least one alcohol selected from the group consisting of methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiroglycol, triethylene glycol, pentaerythritol, tris(hydroxyethyl)isocyanurate, N,N'-bis(hydroxyethyl)oxamide, 3-thiaundecanol, 3-thiapentadecenol, trimethylhexandiol, trimethylolpropane, and 4-hydroxymethyl-1-phospha-2,6,7-trioxabicyclo[2,2,2]octane;

amides of β-(3,5-di-tert-butyl-4-hydroxyphenyl)propionic acid, such as N,N'-bis[3-(3',5'-di-tert-butyl-4'-hydroxyphenyl)propionyl]hydrazine, N,N'-bis[3-(3',5'-di-tert-butyl-4'-hydroxyphenyl)propionyl]hexamethylenediamine, N,N'-bis[3-(3',5'-di-tert-butyl-4'-hydroxyphenyl)propionyl]trimethylenediamine, and mixtures thereof; and tocopherols, such as α-tocopherol, β-tocopherol, β-tocopherol, δ-tocopherol and mixtures thereof.

Examples of the hydroquinone-based antioxidants include hydroquinone, 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyphenyl stearate, bis(3,5-di-tert-butyl-4-hydroxyphenyl)adipate, and mixtures thereof.

Examples of the sulfur-containing antioxidants include 2,4-bis[(octylthio)methyl]-O-ocresol, 4,6-bis(dodecylthiomethyl)-O-cresol, dilauryl 3,3'-thiodipropionate, tridecyl 3,3'-thiodipropionate, dimyristyl 3,3'-thiodipropionate, distearyl 3,3'-thiodipropionate, lauryl stearyl 3,3'-thiodipropionate, neopentanetetrayl tetrakis(3-laurylthiopropionate), and pentaerythrityl tetrakis(3-laurylthio propionate).

Examples of the phosphorus-containing antioxidants include triphenyl phosphite, tris(nonylphenyl)phosphite, tris(2,4-di-tert-butylphenyl)phosphite, 6-[3-(3-tert-butyl-4-hydroxy-5-methylphenyl)propoxy]-2,4,8,10-tetra-tert-butylbenzo[d,f][1,3,2]dioxaphosphepin, trilauryl phosphite, trioctadecyl phosphite, distearyl pentaerythritol diphosphite, diisodecyl pentaerythritol diphosphite, bis(2,4-di-tert-butylphenyl)pentaerythritol diphosphite, bis(2,4-di-tert-butyl-6-methylphenyl)pentaerythritol diphosphite, bis(2,6-di-tert-butyl-4-methylphenyl)pentaerythritol diphosphite, bis(2,4,6-tri-tert-butylphenyl)pentaerythritoldiphosphite, tristearylsorbitol triphosphite, tetrakis(2,4-di-tert-butylphenyl)-4,4'-diphenylene diphosphite, 2,2'-methylenebis(4,6-di-tert-butylphenyl)2-ethylhexyl phosphite, 2,2'-ethylidenebis(4,6-di-tert-butylphenyl) fluorophosphite, bis(2,4-di-tert-butyl-6-methylphenyl)ethyl phosphite, bis(2,4-di-tert-butyl6-methylphenyl)methyl phosphite, 2-(2,4,6-tri-tert-butylphenyl)-5-ethyl-5-butyl-1,3,2-oxaphosphorinane, 2,2',2"-nitrilo[triethyl-tris(3,3',5,5'-tetra-tert-butyl-1,1'-biphenyl-2,2'-diyl)phosphite, and mixtures thereof.

Examples of the UV absorbers include salicylate derivatives, such as phenyl salicylate, 4-tert-butylphenyl salicylate, 2,4-di-tert-butylphenyl 3',5'-di-tert-butyl-4'-hydroxybenzoate, 4-tert-octylphenyl salicylate, bis(4-tert-butylbenzoyl) resorcinol, benzoyl resorcinol, hexadecyl 3',5'-di-tert-butyl-4'-hydroxybenzoate, octadecyl 3',5'-di-tert-butyl-4'-hydroxybenzoate, 2-methyl-4,6-di-tert-butylphenyl 3',5'-di-tert-butyl-4'-hydroxybenzoate, and mixtures thereof;

2-hydroxybenzophenone derivatives, such as 2,4-dihydroxybenzophenone, 2-hydroxy-4-methoxybenzophenone, 2-hydroxy-4-octoxybenzophenone, 2,2'-dihydroxy-4-methoxybenzophenone, bis(5-benzoyl-4-hydroxy-2-methoxyphenyl)methane, 2,2',4,4'-tetrahydroxybenzophenone, and mixtures thereof;

2-(2'-hydroxyphenyl)benzotriazoles, such as 2-(2-hydroxy-5-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-tert-octylphenyl) benzotriazole, 2-(3-tert-butyl-2-hydroxy-5-methylphenyl)-5-chlorobenzotriatole, 2-(3'-sec-butyl-2'-hydroxy-5'-tert-butylphenyl)benzotriazole, 2-(2'-hydroxy-4'-octyloxyphenyl)benzotriazole, 2-(3',5'-di-test-amyl-2'-hydroxyphenyl)benzotriazole, 2-[2'-hydroxy-3',5'-bis(α,α-dimethylbenzyl)phenyl]-2H-benzotriazole, 2-[(3'-tert-butyl 2'-hydroxyphenyl)-5'-(2-octyloxycarbonylethyl)phenyl]-5-chlorobenzotriazole, 2-[3'-tert-butyl-5'-[2-(2-ethylhexyloxy) carbonylethyl]-2'-hydroxyphenyl]-5-chlorobenzotriazole, 2-[3'-tert-butyl-2'-hydroxy-5'-(2-methoxycarbonylethyl) phenyl]-5-chlorobenzotriazole, 2-[3'-tert-butyl-2'-hydroxy-5'-(2-methoxycarbonylethyl)phenyl]benzotriazole, 2-[3'-tert-butyl-2'-hydroxy-5-(2-octyloxycarbonylethyl)phenyl] benzotriazole, 2-[3'-tert-butyl-2'-hydroxy-5'-[2-(2-ethylhexyloxy)carbonyl ethyl]phenyl]benzotriazole, 2-[2-hydroxy-3-(3,4,5,6-tetrahydrophthalimidomethyl)-5-methylphenyl]benzotriazole, 2-(3,5-di-text-butyl-2-hydroxyphenyl)-5-chlorobenzotriazole, 2-(3'-dodecyl-2'-hydroxy-5'-methylphenyl)benzotriazole, 2-[3'-tert-butyl-2'-hydroxy-5'-(2-isooctyloxycarbonylethyl)phenyl] benzotriazole, and mixtures thereof, 2,2'-methylenebis[6-(2H-benzotriazol-2-yl)-4-(1,1,3,3-tetrametylbutyl)phenol, 2,2'-methylenebis[(4-tert-butyl-6-(2H-benzotriazol-2-yl) phenol)], condensates of poly(3-11)(ethylene glycol) with 2-[3'-tert-butyl-2'-hydroxy-5'-(2-methoxycarbonylethyl) phenyl]benzotriazole, condensates of poly(3-11)(ethylene glycol) with methyl-3-[3-(2H-benzotriazol-2-yl)-5-tert-butyl-4-hydroxyphenyl]propionate, 2-ethylhexyl 3-[3-tert-butyl-5-(5-chloro-2H-benzotriazol-2-yl)-4-hydroxyphenyl] propionate, octyl 3-[3-tert-butyl-5-(5-chloro-2H-benzotriazol-2-yl)-4-hydroxyphenyl]propionate, methyl 3-[3-tert-butyl-5-(5-chloro-2H-benzotriazol-2-yl)-4-hydroxyphenyl]propionate, 3-[3-tert-butyl-5-(5-chloro-2H-benzotriazol-2-yl)-4-hydroxyphenyl]propionic acid, and mixtures thereof.

Examples of the light stabilizers include hindered amine light stabilizers, such as bis(2,2,6,6-tetramethyl-4-piperidyl) sebacate, bis((2,2,6,6-tetramethyl-4-piperidyl)succinate, bis (1,2,2,6,6-pentamethyl-4-piperidyl)sebacate, bis(N-octoxy-2,2,6,6-tetramethyl-4-piperidyl)sebacate, bis(N-benzyloxy-2,2,6,6-tetramethyl-4-piperidyl)sebacate, bis(N-cyclohexyloxy-2,2,6,6-tetramethyl-4-piperidyl)sebacate, bis (1,2,2,6,6-pentamethyl-4-piperidyl)2-(3,5-di-tert-butyl-4-hydroxybenzyl)-2-butylmalonate, bis(1-acroyl-2,2,6,6-tetramethyl-4-piperidyl)2,2-bis(3,5-di-tert-butyl-4-hydroxybenzyl)-2-butylmalonate, bis(1,2,2,6,6-pentamethyl-4-piperidyl)decane dioate, 2,2,6,6-tetramethyl-4-piperidyl methacrylate, 4-[3-(3,5-di-tert-butyl-4-hydroxyphenyl)propionyloxy]-1-[2-(3-(3,5-di-tert-butyl-4-hydroxyphenyl)propionyloxy)ethyl]-2,2,6,6-tetramethylpiperidine, 2-methyl-2-(2,2,6,6-tetramethyl-4-piperidyl)amino-N-(2,2,6,6-tetramethyl-4-piperidyl) propionamide, tetrakis(2,2,6,6-tetramethyl-4-piperidyl)1,2,3,4-butanetetracarboxylate, tetrakis(1,2,2,6,6-pentamethyl-4-piperidyl)1,2,3,4-butanetetracarboxylate, mixed esters of 1,2,3,4-butanetetracarboxylic acid with 1,2,2,6,6-pentamethyl-4-piperidinol and 1-tridecanol, mixed esters of 1,2,3,4-butanetetracarboxylic acid with 2,2,6,6-tetramethyl-4-piperidinol and 1-tridecanol, mixed eaters of 1,2,3,4-butanetetracarboxylic acid with 1,2,2,6,6-pentamethyl-4-piperidinol and 3,9-bis(2-hydroxy-1,1-dimethylethyl)-2,4,8,10-tetraoxaspiro [5.5]undecane, mixed esters of 1,2,3,4-butanetetracarboxylic acid with 2,2,6,6-tetramethyl-4-piperidinol and 3,9-bis(2-hydroxy-1,1-dimethylethyl)-2,4,8,10-tetraoxaspiro [5.5]undecane, polycondensates of dimethyl succinate with 1-(2-hydroxyethyl)-4-hydroxy-2,2,6,6-tetramethylpiperidine, poly[(6-morpholine-1,3,5-triazine-2,4-diyl)((2,2,6,6-tetramethyl-4-piperidyl)imino)hexamethylene((2,2,6,6-tetramethyl-4-piperidyl)imino)], poly[{6-(1,1,3,3-tetrametylbutyl)amino-1,3,5-triazine-2,4-diyl}{(2,2,6,6-tetramethyl-4-piperidyl)imino}hexamethylene{(2,2,6,6-tetramethyl-4-piperidyl)imino}], polycondensates of N,N'-bis(2,2,6,6-tetramethyl-4-piperidyl)hexamethylenediamine with 1,2-dibromoethane, N,N',4,7-tetrakis[4,6-bis(N-butyl-N-(2,2,6,6-tetramethyl-4-piperidyl)amino)-1,3,5-triazin-2-yl]-4,7-diazadecane-1,10-diamine, N,N',4-tris[4,6-bis(N-butyl-N-(2,2,6,6-tetramethyl-4-piperidyl) amino)-1,3,5-triazin-2-yl]-4,7-diazadecane-1,10-diamine, N,N',4,7-tetrakis[4,6-bis(N-butyl-N-(1,2,2,6,6-pentamethyl-4-piperidyl)amino)-1,3,5-triazin-2-yl]-4,7-diazadecane-1,10-diamine, N,N',4-tris[4,6-bis(N-butyl-N-(1,2,2,6,6-pentamethyl-4-piperidyl)amino)-1,3,5-triazin-2-yl]-4,7-diazadecane-1,10-diamine, and mixtures thereof;

acrylate type light stabilizers, such as ethyl α-cyano-β,β-diphenyl acrylate, isooctyl α-cyano-β,β-diphenyl acrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate, N-(β-carbomethoxy-β-cyanovinyl)-2-methylindoline, and mixtures thereof;

nickel-containing light stabilizers, such as nickel complexes of 2,2'-thiobis-[4-(1,1,3,3-tetrametylbutyl)phenol], nickel dibutyldithiocarbamate, nickel salts of monoalkyl esters, nickel complexes of ketoximes, and mixtures thereof;

oxamide type light stabilizers such as 4,4'-dioctyloxyoxanilide, 2,2'-diethoxyoxanilide, 2,2'-dioctyloxy-5,5'-di-tert-butylanilide, 2,2'-didodecyloxy-5,5'-di-tert-butylanilide, 2-ethoxy-2'-ethyloxanilide, N,N'-bis(3-dimethylaminopropyl)oxamide, 2-ethoxy-5-tert-butyl-2'-ethoxyanilide, 2-ethoxy-5,4'-di-tert-butyl-2'-ethyloxanilide, and mixtures thereof; and 2-(2-hydroxyphenyl)-1,3,5-triazine type light stabilizers, such as 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-[2,4-dihydroxyphenyl-4,6-bis(2,4-dimethylphenyl)-1,3,5-triazine, 2,4-bis(2-hydroxy-4-propyloxyphenyl)-6-(2,4-dimethylphenyl)2-(2-hydroxy-4-octyloxyphenyl)-4,6-bis(4-methylphenyl)-1,3,5-triazine, 2-(2-hydroxy-4-dodecyloxyphehyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethylphenyl)-1,3,5-triazine, 2-[2-hydroxy-4-(2-hydroxy-3-octyloxypropoxy)phenyl]-4,6-bis(2,4-dimethylphenyl)-1,3,5-triazine, and mixtures thereof.

Examples of other stabilizers include hydroxylamines, such as N,N-dibenzylhydroxyamine, N,N-diethylhydroxyamine, N,N-dioctylhydroxyamine, N,N-dilaurylhydroxyamine, N,N-ditetradecylhydroxyamine, N,N-dihexadecylhydroxyamine, N,N-dioctadecylhydroxyamine, N-hexadecyl-N-octadecylhydroxyamine, N-heptadecyl-N-octadecylhydroxyamine, and mixtures thereof.

Examples of the metal deactivators include metal deactivators such as thiocarbamates, salicylic acids, benzotriazoles, imidazoles, and thiadiazoles.

Examples of the nucleating agents include nucleating agents such as metal salts of phosphoric acid, benzylidenesorbitols, and metal salts of carboxylic acids.

Examples of the lubricants include aliphatic hydrocarbons such as paraffins and waxes, higher fatty acids having 8 to 22 carbon atoms, salts of metals (Al, Ca, Mg, Zn) with higher fatty acids having 8 to 22 carbon atoms, aliphatic alcohols having 8 to 22 carbon atoms, polyglycols, esters of higher fatty acids having 4 to 22 carbon atoms with aliphatic monohydric alcohols having 4 to 18 carbon atoms, higher aliphatic amides having 8 to 22 carbon atoms, silicone oil, and rosin derivatives.

Examples of the antistatic agents include nonionic antistatic agents, such as esters and ethers; anionic antistatic agents, such as sulfonates and phosphates; cationic antistatic agents; and amphoteric antistatic agents.

Examples of the flame retardants include inorganic flame retardants, such as magnesium hydroxide and aluminum hydroxide; and organic flame retardants, such as halogen-containing flame retardants and phosphorus-containing flame retardants.

Examples of the pigments include organic pigments, such as isoindolinone pigments, azo pigments, phthalocyanine pigments, threne pigments, and quinacridone pigments; and inorganic pigments, such as carbon black, rouge, chrome yellow, molybdate orange, normal lead chromate, lead molybdate, titanium white, ultramarine blue, Berlin blue/cobalt blue, titanium yellow, graphite, and zinc white.

Among these additives, the phenol-based antioxidants, the phosphorus-containing antioxidants, the sulfur-containing antioxidants, the UV absorbers, and the hindered amine light stabilizers are preferably used.

More preferable phenol-based antioxidants include 2-[1-(2-hydroxy-3,5-di-tert-pentylphenyl)ethyl]-4,6-di-tert-pentylphenyl acrylate, 2-tert-butyl-6-(3-tert-butyl-2-hydroxy-5-methylbenzyl)-4-methylphenyl acrylate, 2,6-di-tert-butyl-4-methylphenol, 2,4,6-tri-tert-butylphenol, 2,4-dioctylthiomethyl-6-methylphenol, 2,2'-thiobis(6-tert-butylphenol), 2,2'-methylenebis(4-methyl-6-tert-butylphenol), 2,2'-methylenebis(4-ethyl-6-tert-butylphenol), 2,2'-methylenebis[4-methyl-6-(α-methylcyclohexyl)phenol]], 2,2'-methylenebis(4-methyl-6-cyclohexylphenol), 2,2'-methylenebis(4,6-di-tert-butylphenol), 2,2'-ethylidenebis(4,6-di-tert-butylphenol), 4,4'-methylenebis(6-tert-butyl-2-methylphenol), 4,4'-methylenebis(2,6-di-tert-butylphenol), 4,4'-butylidenebis(3-methyl-6-tert-butylphenol), 1,1-bis(4-hydroxyphenyl)cyclohexane, 1,1-bis(5-tert-butyl-4-hydroxy-2-methylphenyl)butane, 1,1,3-tris(5-tert-butyl-4-hydroxy-2-methylphenyl)butane, ethylene glycol bis[3,3-bis-3'-tert-butyl-4'-hydroxyphenyl]butyrate], 2,4,6-tris(3,5-di-tert-butyl-4-phenoxy)-1,3,5-triazine, tris(4-tert-butyl-3-hydroxy-2,6-dimethylbenzyl)isocyanurate, bis(3,5-di-tert-butyl-4-hydroxybenzyl)isocyanurate, tris[2-(3',5'-di-tert-butyl-4'-hydroxycinnamoyloxy)ethyl]isocyanurate, diethyl-3,5-di-tert-butyl-4-hydroxybenzyl phosphonate, di-n-octadecyl-3,5-di-tert-butyl-4-hydroxybenzyl phosphonate, calcium salt of 3,5-di-tert-butyl-4-hydroxybenzylphosphonic acid monoester, n-octadecyl 3-(3,5-di-tert-butyl-4-hydroxyphenyl)propionate, neopentanetetrayl tetrakis(3,5-di-tert-butyl-4-hydroxycinnamate), thiodiethylene bis(3,5-di-tert-butyl-4-hydroxycinnamate)1,3,5-trimethyl-2,4,6-tris(3,5-di-tert-butyl-4-hydroxybenzyl)benzene, 3,6-dioxaoctamethylene bis(3,5-di-tert-butyl-4-hydroxycinnamate), hexamethylene bis(3,5-di-tert-butyl-4-hydroxycinnamate), triethylene glycol bis(5-tert-butyl-4-hydroxy-3-methylcinnamate), 3,9-bis[2-(3-(3-tert-butyl-4-hydroxy-5-methylphenyl)propionyloxy)-1,1-dimethylethyl]-2,4,8,10-tetraoxaspiro[5.5]undecane), N,N'-bis[(3-(3',5'-di-tert-butyl-4'-hydroxyphenyl)propionyl]hydrazine, and N,N'-bis[(3-(3',5'-di-tert-butyl-4'-hydroxyphenyl)propionyl]hexamethylenediamine. These are used singly or in combination.

More preferable phosphorus-containing antioxidants include tris(nonylphenyl)phosphite, tris(2,4-di-tert-butylphenyl)phosphite, 6-[3-(3-tert-butyl-4-hydroxy-5-methylphenyl)propoxy]-2,4,8,10-tetra-tert-butylbenzo[d,f][1,3,2]dioxaphosphepin, distearylpentaerythritol diphosphite, bis(2,4-di-tert-butylphenyl)pentaervthritol diphosphite, bis(2,4-di-tert-butyl-6-methylphenyl)pentaerythritol diphosphite, bis(2,6-di-tert-butyl-4-methylphenyl)pentaerythritol diphosphite, tetrakis(2,4-di-tert-butylphenyl)-4,4'-diphenylene diphosphonite, 2,2'-methylenebis(4,6-di-tert-butylphenyl)2-ethylhexylphosphite, 2,2'-ethylidenebis(4,6-di-tert-butylphenyl)fluorophosphite, bis(2,4-di-tert-butyl-6-methylphenyl)ethyl phosphite, 2-(2,4,6-tri-tert-butylphenyl)-5-ethyl-5-butyl-1,3,2-oxaphosphorinane, and 2,2',2"-nitrilo(triethyl-tris(3,3',5,5'-tetra-tert-butyl-1,1'-biphenyl 2,2'-diyl) phosphite. These are used singly or in combination.

More preferable UV absorbers include phenyl salicylate, 4-tert-butylphenyl salicylate, 2,4-di-tert-butylphenyl 3',5'-di-tert-butyl-4'-hydroxybenzoate, 4-tert-octylphenyl salicylate, 2,4-dihydroxybenzophenone, 2-hydroxy-4-methoxybenzophenone, 2-hydroxy-4-octoxybenzophenone, 2,2'-dihydroxy-4-methoxybenzophenone, bis(5-benzoyl-4-hydroxy-2-methoxyphenyl)methane, 2,2',4,4'-tetrahydroxybenzophenone, 2-(2-hydroxy-5-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-tert-octylphenyl)benzotriazole, 2-(3-tert-butyl-2-hydroxy-5-methylphenyl)-5-chlorobenzotriazole, 2-(3'-sec-butyl-2'-hydroxy-5'-tert-butylphenyl)benzotriazole, 2-(2'-hydroxy-4'-octyloxyphenyl)benzotriazole, 2-(3',5'-di-tert-amyl-2'-hydroxyphenyl)benzotriazole, and 2-[2'-hydroxy-3',5'-bis-(α,α-dimethylbenzyl)phenyl]-2H-benzotriazole. These are used singly or in combination.

More preferable hindered amine light stabilizers include bis(2,2,6,6-tetramethyl-4-piperidyl)sebacate, bis(1,2,2,6,6-pentamethyl-4-piperidyl)sebacate, bis(N-octoxy-2,2,6,6-tetramethyl-4-piperidyl)sebacate, bis(N-benzyloxy-2,2,6,6-tetramethyl-4-piperidyl)sebacate, bis(N-cyclohexyloxy-2,2,6,6-tetramethyl-4-piperidyl)sebacate, bis(1,2,2,6,6-pentamethyl-4-piperidyl)2-(3,5-di-tert-butyl-4-hydroxybenzyl)-2-butylmalonate, bis(1-acroyl-2,2,6,6-tetramethyl-4-piperidyl)2,2-bis(3,5-di-tert-butyl-4-hydroxybenzyl)-2-butylmalonate, bis(2,2,6,6-tetramethyl-4-piperidyl)succinate, 2,2,6,6-tetramethyl-4-piperidyl methacrylate, 4-[3-(3,5-di-tert-butyl-4-hydroxyphenyl)propionyloxy]-1-[2-(3-(3,5-di-tert-butyl-4-hydroxyphenyl)propionyloxy)ethyl]-2,2,6,6-tetramethylpiperidine, 2-methyl-2-(2,2,6,6-tetramethyl-4-piperidyl)amino-N-(2,2,6,6-tetramethyl-4-piperidyl)propionamide, tetrakis(2,2,6,6-tetramethyl-4-piperidyl)1,2,3,4-butanetetracarboxylate, tetrakis(1,2,2,6,6-pentamethyl-4-piperidyl)1,2,3,4-butanetetracarboxylate, mixed esters of 1,2,3,4-butanetetracarboxylic acid with 1,2,2,6,6-pentamethyl-4-piperidinol and 1-tridecanol, mixed esters of 1,2,3,4-butanetetracarboxylic acid with 2,2,6,6-tetramethyl-4-piperidinol and 1-tridecanol, mixed esters of 1,2,3,4-butanetetracarboxylic acid with 1,2,2,6,6-pentamethyl-4-piperidinol and 3,9-bis(2-hydroxy-1,1-dimethylethyl)-2,4,8,10-tetraoxaspiro[5.5]undecane, mixed esters of 1,2,3,4-butanetetracarboxylic acid with 2,2,6,6-tetramethyl-4-piperidinol and 3,9-bis(2-hydroxy-1,1-dimethylethyl)-2,4,8,10-tetraoxaspiro[5.5]undecane, polycondensates of dimethyl succinate with 1-(2-hydroxyethyl)-4-hydroxy-2,2,6,6-tetramethylpiperidine, poly[(6-morpholino-1,3,5-triazine-2,4-diyl)((2,2,6,6-tetramethyl-4-piperidyl)imino)hexamethylene((2,2,6,6-tetramethyl-4-piperidyl)imino)], and poly[{6-(1,1,3,3-tetrametylbutyl)amino-1,3,5-triazine-2,4-diyl}{(2,2,6,6-tetramethyl-4-piperidyl)imino}hexamethylene{(2,2,6,6-tetramethyl-4-piperidyl)imino}]. These are used singly or in combination.

Where antioxidants are incorporated into a polyolefin, the total content of the antioxidants is preferably 0.01 parts by weight to 5 parts by weight per 100 parts by weight of the polyolefin.

In the first molten resin kneading zone, the polyolefin fed through the resin feeding port is melt-kneaded, so that a portion filled with molten resin is formed.

Water is fed from the molten resin partially filled zone that is prevented from being fully filled with molten resin. The amount of the water to be fed is 0.01 to 50 parts by weight, preferably 0.1 to 10 parts by weight, relative to 100 parts by weight of the polyolefin. If it is more than 50 parts by weight, then the resin will foam at the vent port and come to have an excessively increased volume, resulting in the occurrence of vent-up. If it is less than 0.01 parts by weight, then volatile components contained in the polyolefin may be removed insufficiently.

In the present invention, since water is fed to the molten resin partially filled zone that is prevented from being fully filled with molten resin, cavitation can be prevented and a portion filled with molten resin, which portion has been formed in the first molten resin kneading zone located upstream from the molten resin partially filled zone, can prevent water from backflowing toward the upstream.

In the second molten resin kneading zone, mixing of molten resin with water can be carried out. When this zone has been fully filled with molten resin and added water, this zone performs a function to block between the molten resin partially filled zone and the devolatilization zone.

At the devolatilization zone, foaming devolatilization is performed and thereby volatile components contained in the polyolefin are removed. The temperature of the cylinder is 50 to 350° C., preferably 100 to 250° C. Where it is lower than 50° C., the polyolefin will fail to melt sufficiently and, as a result, it may not be conveyed successfully with a screw, whereas if it exceeds 350° C., since the polyolefin is degraded, the low fogging property of the product may be poor. The pressure of the devolatilization zone is preferably −100 to 0 kPa-G, more preferably −100 to −10 kPa-G. If it exceeds −10 kPa-G, the low fogging property may not be improved because of insufficient devolatilization. The water to be used may be conventional water; examples thereof include well water, tap water, drinking water, industrial water, and pure water.

The devolatilized polyolefin produced by the production method of the present invention is superior in low fogging property, so that it can be used as a molded article produced by molding a raw material containing the devolatilized polyolefin and it is preferred to use the molded article as an automotive interior material.

Hereafter, preferable embodiments of the method for producing a devolatilized polyolefin according to the present invention are described in detail with reference to drawings. The description is made by using the same code for the same or equivalent part as that in the conventional example.

Figure 2:
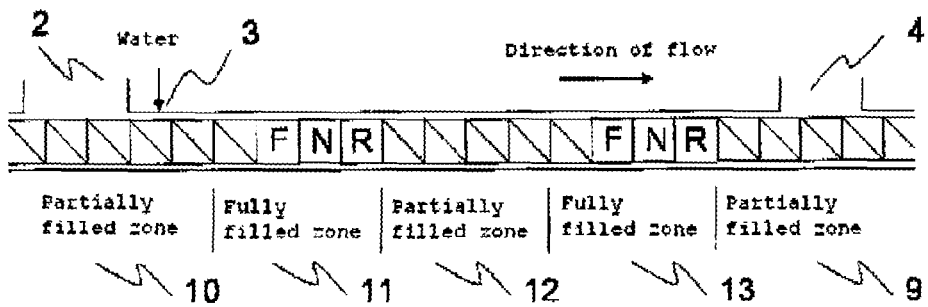
FIG. 2 includes a diagram that shows a cross-sectional view taken along the axial direction of the twin screw extruder to be used for a conventional method for producing a devolatilized polyolefin and a diagram showing the characteristic of filling a resin in the axial direction.
Figure 3:
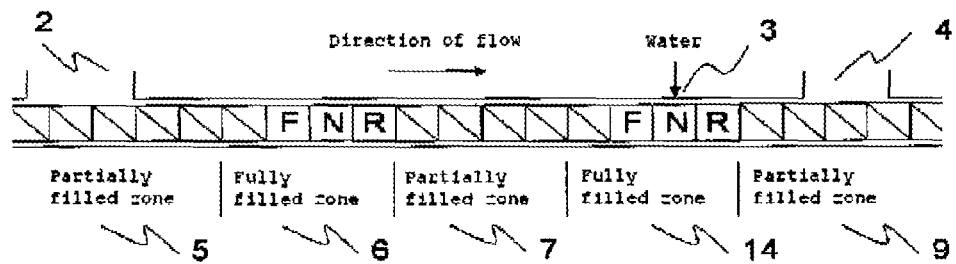
FIG. 3 includes a diagram that shows a cross-sectional view taken along the axial direction of the twin screw extruder to be used for a conventional method for producing a devolatilized polyolefin and a diagram showing another embodiment of the characteristic of filling a resin in the axial direction.
Figure 4:
FIG. 4 is a photograph taken, during the fogging test of Example 1, by reflecting light emitted from a fluorescent lamp, on the object to be tested.
Figure 5:
FIG. 5 is a photograph taken, during the fogging test of Comparative Example 1, by reflecting light emitted from a fluorescent lamp, on the object to be tested.

In each of FIGS. 1 to 3, the member indicated by code 1 is a cylinder of a twin screw extruder, the upper portion of which is partially depicted; on the top surface of the cylinder 1 are arranged in order from the upstream side a polyolefin feeding port 2, a water injection port 3, and a vent port 4, and within the cylinder 1, a pair of co-rotatable screws is arranged freely rotatably with the screws being mated with each other.

FIG. 1, in the cylinder 1 are arranged in order from the upstream side a molten resin partially filled zone (first molten resin partially filled zone) 5, a first molten resin kneading zone 6, a molten resin partially filled zone (second molten resin partially filled zone) 7 having the above-mentioned water injection port 3, a second molten resin kneading zone 8, and a devolatilization zone 9 having the above-mentioned vent port 4. The screw of the first molten resin kneading zone 6 and the screw of the second molten resin kneading zone 8 are constituted by a plurality of screws for kneading dispersion in an arbitrary combination of well-known forward, orthogonal, reverse, or other type of kneading discs.

In FIG. 2, in the cylinder 1 are provided, in order from the upstream side, a molten resin partially filled zone 10 having a water injection port 3, a first molten resin kneading zone 11, a molten resin partially filled zone 12, a second molten resin kneading zone 13, and a devolatilization zone 9 having the above-mentioned vent port 4. The screw of the first molten resin kneading zone 11 and the screw of the second molten resin kneading zone 13 are constituted by a plurality of screws for kneading dispersion in an arbitrary combination of well-known forward, orthogonal, reverse, or other type of kneading discs.

In FIG. 3, in the cylinder 1 are provided, in order from the upstream side, a molten resin partially filled zone 5, a first molten resin kneading zone 6, a molten resin partially filled zone 7, a molten resin dispersing/kneading zone 14 having the water injection port 3, and a devolatilization zone 9 having the above-mentioned vent port 4. The screw of the first molten resin kneading zone 6 and the screw of the molten resin dispersing/kneading zone 14 are constituted by a plurality of screws for kneading dispersion in an arbitrary combination of well-known forward, orthogonal, reverse, or other type of kneading discs.

EXAMPLES

The present invention is explained by reference to Examples and Comparative Examples below.

The evaluation of physical properties was performed by the following methods.

Fogging test: After the execution of water injection foaming devolatilization, strand cutting was carried out, and then the resulting cubic pellets of 3 mm on each side were put into a container and covered with a glass cover and heated for 20 hours by using an apparatus in accordance with the provision of ISO 6452 while setting the heating temperature to 120° C. and the glass cover temperature to 25° C., and then the appearance of the glass cover was observed. By visual observation of the attachment to the glass cover, the case where there was a little attachment was judged that the low fogging property was good and was represented by "◯", whereas the case where there was much attachment was judged that the low fogging property was poor and was represented by "x".

Example 1

Using a twin screw extruder (KZW15-45MG) manufactured by Technovel Corp. and also using an extruder with the screw configuration illustrated in FIG. 1, polypropylene pellets (U501E1 produced by Sumitomo Chemical Co., Ltd.) were fed and water was injected at a rate of 30 g/hr through the water injection port-depicted in FIG. 1 by using a gear pump under the preset conditions including a cylinder temperature of 210° C., a screw rotation speed of 300 rpm, and a vent pressure of −100 kPaG. The molten resin extruded was 210° C. in temperature. The strand of the molten resin discharged from the extruder was cut, so that cubic pellets of 3 mm on each side were obtained. The result of the fogging test is shown in Table 1.

Comparative Example 1

A devolatilization operation was performed in the same manner as Example 1 except that water was not injected. The molten resin extruded was 210° C. in temperature. The result of the fogging test is shown in Table 1.

Comparative Example 2

Although a devolatilization operation was performed in the same manner as Example 1 except that the screw configuration of Example 1 was replaced by the screw configuration illustrated in FIG. 2, molten resin and water were not mixed successfully in the first kneading zone and the water flowed backwards.

Comparative Example 3

Although a devolatilization operation was performed in the same manner as Example 1 except that the screw configuration of Example 1 was replaced by the screw configuration illustrated in FIG. 3, cavitation occurred in the water injection line and a water injection operation was not performed successfully.

TABLE 1

|  | Water injection stability | Amount of resin fed [kg/hr] | Water injection amount [g/Hr] | Water injection amount [phr] | Fogging test Visual observation |
| --- | --- | --- | --- | --- | --- |
| Example 1 | ○ | 6 | 30 | 0.5 | ○ |
| Comparative Example 1 | No water injection | 6 | 0 | 0 | x |
| Comparative Example 2 | x | 6 | 30 | 0.5 | — |
| Comparative Example 3 | x | 6 | 30 | 0.5 | — |

In the table, as to the water injection stability, the symbol "○" means that the water injection stability is good, and the symbol "x" means that the water injection stability is poor.

What is claimed is:

1. A method for producing a devolatilized polyolefin, the method comprising steps of:
   providing a twin screw extruder comprising a resin feeding port, a first molten resin kneading zone, a molten resin partially filled zone which is prevented from being fully filled with molten resin, a second molten resin kneading zone, and a devolatilization zone disposed in order from upstream of a cylinder of the extruder;
   feeding a polyolefin through the resin feeding port; and
   feeding water to the molten resin partially filled zone in an amount of 0.01 to 50 parts by weight relative to 100 parts by weight of the polyolefin, thereby performing foaming devolatilization of the polyolefin.

2. The method according to claim 1, wherein the molten resin partially filled zone has been formed by providing a flight section within the cylinder.

3. The method according to claim 1, wherein the polyolefin is a polypropylene.

4. A molded article comprising a devolatilized polyolefin prepared by the method according to claim 1.

5. The molded article according to claim 4, wherein the molded article is an automotive interior material.

6. A method for producing an automotive interior material, wherein the method comprises molding a raw material containing a devolatilized polyolefin prepared by the method according to claim 1.

* * * * *